United States Patent
Saito

(10) Patent No.: US 7,219,563 B2
(45) Date of Patent: May 22, 2007

(54) NON-CONTACT POSITION SENSOR

(75) Inventor: Masashi Saito, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 16 days.

(21) Appl. No.: 10/910,418

(22) Filed: Aug. 4, 2004

(65) Prior Publication Data

US 2005/0028614 A1     Feb. 10, 2005

(30) Foreign Application Priority Data

Aug. 5, 2003    (JP)   ................. 2003-286400

(51) Int. Cl.
     *G01L 3/02*       (2006.01)
(52) U.S. Cl. ................ 73/862.331; 73/862.333
(58) Field of Classification Search ...............
                                    73/862.331–862.333

See application file for complete search history.

(56) References Cited

U.S. PATENT DOCUMENTS

| | | | |
|---|---|---|---|
| 4,808,868 A * | 2/1989 | Roberts | 310/68 R |
| 5,111,098 A * | 5/1992 | Peck et al. | 310/268 |
| 5,349,293 A * | 9/1994 | Tanaka et al. | 324/207.16 |
| 5,757,181 A | 5/1998 | Wolf et al. | |
| 6,396,259 B1 * | 5/2002 | Washeleski et al. | 324/207.22 |
| 6,553,091 B2 * | 4/2003 | Takanashi et al. | 378/15 |

FOREIGN PATENT DOCUMENTS

| | | |
|---|---|---|
| EP | 1 083 407 A2 | 3/2001 |
| JP | 2002-048508 | 2/2002 |
| JP | 2002-66945 | 3/2002 |
| JP | 2003-021503 | 1/2003 |

OTHER PUBLICATIONS

European Search Report.

* cited by examiner

*Primary Examiner*—Max Noori
(74) *Attorney, Agent, or Firm*—Crowell & Moring LLP

(57) ABSTRACT

A non-contact position sensor having improved rotational angle measuring accuracy is provided.

A magnet is attached To a rotating shaft. An angle sensor element detects magnetic field changes generated from the magnet due to rotation of the rotating shaft. A signal processor, on the basis of a temperature detected by a temperature sensor, corrects variance between the sensors including the sensor element, the signal processor, and the magnet by correcting an amplitude value and/or an offset value of a signal or variance due to time of the amplitude value. The sensor element 1 outputs the first and second outputs v1 and v2 and the signal processor obtains the temperature coefficients of the amplitude values of the output v1 and output v2, or the temperature coefficients of the offset values, or the coefficients of variance due to time of the amplitude values, obtains the ratio of the first and second outputs corrected by these coefficients, and calculates the angle using the corrected ratio.

2 Claims, 12 Drawing Sheets

NON-CONTACT POSITION SENSOR

CLAIM OF PRIORITY

The present application claims priority from Japanese application Ser. No. 2003-286400, filed on Aug. 5, 2003), the content of which is hereby incorporated by reference into this application.

BACKGROUND OF THE INVENTION

1. Field of the Invention

The present invention relates to a non-contact position sensor for measuring the rotational angle of a rotator.

2. Prior Art

In a conventional non-contact position sensor, for example, as described in Japanese Application Patent Laid-Open Publication No. 2003-21503, the temperature of sensor elements is inferred from the entire resistance of the sensor elements, and the output of the sensor elements is corrected on the basis of the inferred temperature. In Japanese Application Patent Laid-Open Publication No. 2002-48508, the temperature drift is corrected by a temperature compensating coil serially connected to a sensor coil.

SUMMARY OF THE INVENTION

[Problems to be Solved by the Invention]

However, in Japanese Application Patent Laid-Open Publication No. 2003-21503 and Japanese Application Patent Laid-Open Publication No. 2002-48508, differences in the temperature characteristics of sensing elements among sensors and differences in the temperature characteristics of members such as a magnet and a signal processing circuit among sensors are not taken into account. Namely, in Japanese Application Patent Laid-Open Publication No. 2003-21503 and Japanese Application Patent Laid-Open Publication No. 2002-48508, the temperature characteristics of the sensor elements are assumed to be the same in all the sensor elements and the temperatures are uniformly corrected. However, actually, when the sensor elements are examined individually, the temperature characteristics vary with each lot. Further, the temperature characteristics of the members constituting the sensor such as a magnet and a signal processing circuit have respectively variance between parts. Therefore, when in the changing amount of a sensor signal caused by the effect of temperature and variance due to time, variance between parts is seen, a problem arises that during the use period of a position sensor, the accuracy is extremely changed. For example, when the non-contact position sensor is to be used to measure the rotational angle of a car, very high accuracy and stability in the life period are desired.

The present invention is to provide a non-contact position sensor having improved rotational angle measuring accuracy.

[Means for Solving the Problems]

(1) To accomplish the above object, the present invention provides a non-contact position sensor having a magnetic field generation means rotating together with a rotating shaft, a sensor element for sensing magnetic field changes generated from the magnetic field generation means due to the rotation of the rotating shaft, a signal processing means for processing an output signal of the sensor element to measure the rotational angle of the rotating shaft on the basis of the output signal, and a correction means for correcting variance among sensors including the sensor element, signal processing means and magnetic field generation means.

By use of such a constitution, variance between the sensors can be corrected and the rotational angle measuring accuracy can be improved.

(2) In (1) mentioned above, the non-contact position sensor preferably has a temperature sensor for measuring the temperature of the sensor element. The correction means corrects differences in the temperature characteristic among sensors on the basis of the temperature measured by the temperature sensor.

(3) In (2) mentioned above, the correction means, on the basis of the temperature measured by the temperature sensor, preferably corrects the amplitude value and/or offset value of a signal outputted by the signal processing means.

(4) In (2) mentioned above, the correction means, on the basis of the temperature measured by the temperature sensor, preferably corrects variance due to time of the amplitude value of a signal outputted by the signal processing means.

(5) In (1) mentioned above, it is preferable that the sensor element outputs the first and second outputs v1 and v2, and the correction means obtains the temperature coefficients of the amplitude values of the output v1 and output v2, or the temperature coefficients of the offset values, or the coefficients of variance due to time of the amplitude values, obtains the ratio of the first and second outputs corrected by these coefficients, and calculates the angle using the corrected ratio.

DESCRIPTION OF THE PREFERRED EMBODIMENTS

The constitution and operation of the non-contact position sensor of an embodiment of the present invention will be explained below with reference to FIGS. 1 to 19.

Firstly, the whole constitution of the non-contact position sensor of this embodiment will be explained by referring to FIG. 1.

Figure 1:
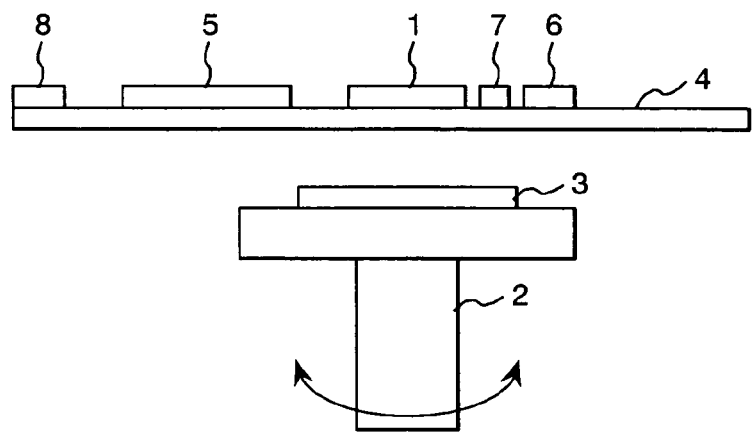
FIG. 1 is a whole block diagram of the non-contact position sensor of an embodiment of the present invention.

FIG. 1 is a whole block diagram of the non-contact position sensor of an embodiment of the present invention.

The position sensor of this embodiment measures the rotational angle of a rotator in non-contact. The rotator is, for example, a steering shaft of a car, a handle rod, or a shift rail.

A rotating shaft 2 is a shaft joined to the rotator and rotates in synchronization with the rotator or is the rotator itself. On the rotating shaft 2, a magnet 3 is installed so as to rotate in synchronization with the rotating shaft 2.

Further, in the area of the magnetic flux generated from the magnet 3, an angle sensor element 1 provided on a circuit substrate 4 is arranged. On the circuit substrate 4, in addition to it, a signal processor 5, a temperature sensor 6, a hall element 7, and a memory 8 are provided.

The temperature sensor 6 is arranged close to the sensor element 1 to measure the temperature of the sensor element 1. Further, the hall element 7 is used to decide the angular area and the operation thereof will be described later by referring to FIG. 5. The hall element 7 is arranged close to the angle sensor element 1 to sense the magnetic flux generated by the magnet 3.

The signal processor 5 executes a signal process for outputs of the angle sensor element 1, the temperature sensor 6, and the hall element 7 and calculates the angle of the rotating shaft 2.

The sensor element 1 is, for example, a giant magnetic resister (GMR) element, or a magnetic resister (MR) element, or an AMR and these elements, depending on the material and manufacturer, differ in the magnetic field necessary for the operation. When an MR element (KMZ43) by Philips is used, the operation magnetic field is recommended to be 25 kA/m or higher.

The magnet 3 is, for example, considered to be ferrite, SmCo, or SmFeN. Particularly when SmFeB (Hitachi Kinzoku, Co., Ltd., Br=650 to 590 mT, Hcb=400 to 440 kA/m) is selected, the shape is set at a diameter of 20 mm and a thickness t of 3 mm, and a yoke material is installed on the lower part of the magnet, thus the distance (air gap) between the magnet 3 and the sensor element 1 is set to 6 mm±1 mm, and at this position, the recommended operation magnetic field of the sensor element 1 can be realized.

The signal processor 5 is, for example, a microcomputer or a PC or DSP board which is externally installed. The circuit substrate 4 is made of, for example, PCB or ceramics or a metal such as SUS. In this case, when a member is arranged between the sensor element 1 and the magnet 3, it must be a non-magnetic substance. In FIG. 1, the circuit substrate 4 is equivalent to a non-magnetic substance.

The memory 8 is used for calibration or correction of sensor output which will be described later and uses a RAM, an EPROM, an EEPROM, or a flash memory. It may be included in a microcomputer.

The temperature sensor 6 may be any sensor which can provide temperature information of the sensor element 1 and for example, may be considered to be a thermistor. However, for example, as described in Japanese Application Patent Laid-Open Publication No. 2003-021503, the sensor for measuring the resistance of the sensor element may be used as a temperature sensor.

Next, by referring to FIG. 2, the circuit configuration of the non-contact position sensor of this embodiment will be explained.

Figure 2:
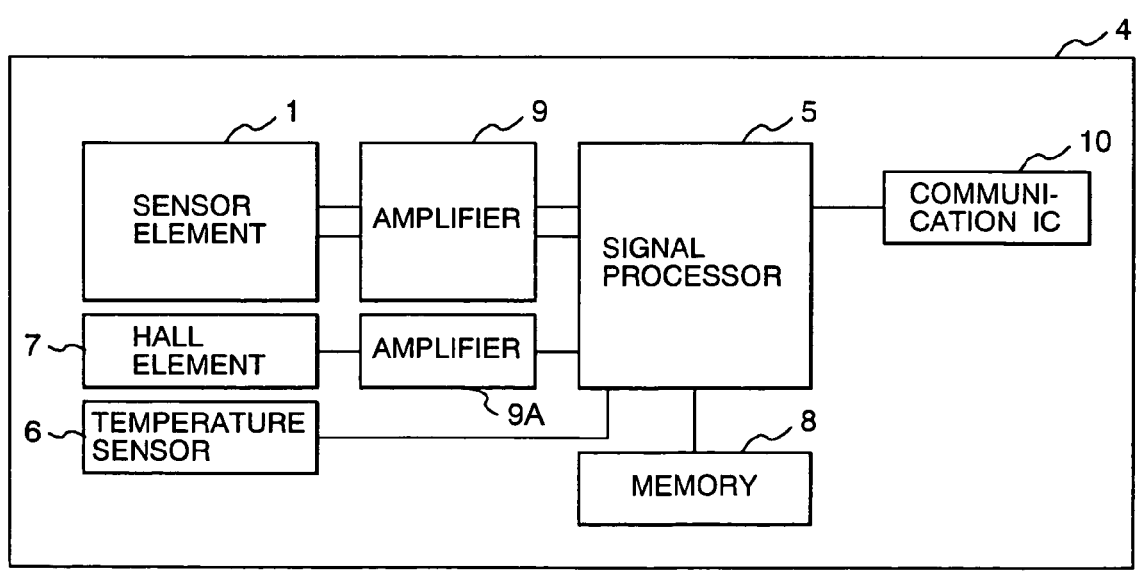
FIG. 2 is a block diagram showing the circuit configuration of the non-contact position sensor of an embodiment of the present invention.

FIG. 2 is a block diagram illustrating the circuit configuration of the non-contact position sensor of an embodiment of the present invention. Further, the same numerals as those illustrated in FIG. 1 indicate the same parts.

On the circuit substrate 4, in addition to the angle sensor element 1, the temperature sensor 6, the hall element 7, and the signal processor 5, amplifiers 9 and 9A for amplifying outputs of the sensor element 1 and the hall element 7 and a communication IC10 for communicating with the outside device are arranged.

The temperature sensor 6 is arranged close to the sensor element 1 to measure accurately the temperature of the sensor element 1. Further, other parts are arranged on the circuit substrate 4, and when there is a heating element among them, the heating element is arranged away from the temperature sensor 6 to prevent the temperature sensor 6 from being affected by the heating element. For example, as a heating element, an FET switch or an FET driver for rotating the rotating shaft may be considered.

Next, by referring to FIG. 3, output signals of the angle sensor element of the non-contact position sensor of this embodiment will be explained.

Figure 3:
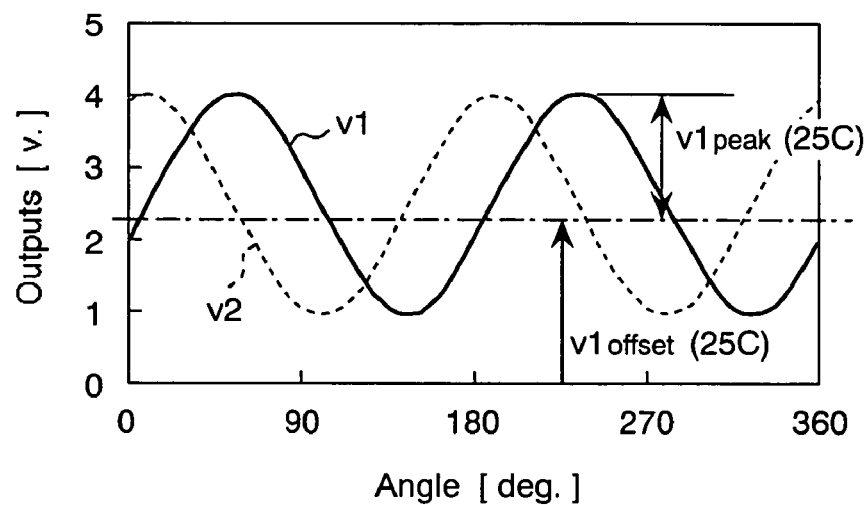
FIG. 3 is a waveform diagram of an output signal of the angle sensor element of the non-contact position sensor of an embodiment of the present invention.

FIG. 3 is a waveform diagram of output signals of the angle sensor element of the non-contact position sensor of an embodiment of the present invention.

Signals v1 and v2 indicate output signals of the angle sensor element 1 which are amplified to about 30 times by the amplifier 9. The signals v1 and v2 are signals of two systems having mutually 45° phase difference corresponding to the rotational angle of the magnet 3 and both the signal periods are 180°. The signals v1 and v2 of two systems, in an ideal state, are respectively a sine wave and a cosine wave in a period of 180°.

Next, by referring to FIGS. 4 to 8, calibration in the non-contact position sensor of this embodiment will be explained.

The output signal supplied from the angle sensor element 1 is ideally a sine wave or a cosine wave at a period of 180° and the angle can be calculated using an arc-tangent. However, there are an assembly error of the rotator and circuit substrate, a soldering error of the sensor element 1, and an attaching error of the magnet and in the output signal of the sensor element 1, there is a difference from the mathematical sine wave and cosine wave. This difference affects the angle accuracy. Therefore, after the signal processor is assembled, that is, after the position relationship between the sensor element 1 and the magnet 3 is decided, calibration must be performed.

Next, by referring to FIG. 4, a calibration device used in the non-contact position sensor of this embodiment will be explained.

Figure 4:
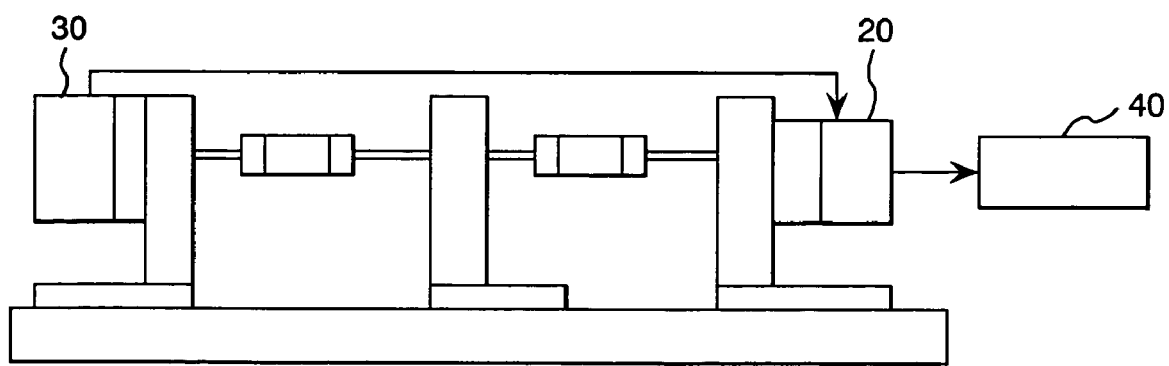
FIG. 4 is a block diagram of the calibration device used in the non-contact position sensor of an embodiment of the present invention.

FIG. 4 is a block diagram of the calibration device used in the non-contact position sensor of an embodiment of the present invention.

On the pedestal, an angle measuring device 20 and a rotary encoder 30 are mounted. And, the rotating shaft of the angle measuring device 20 and the rotating shaft of the rotary encoder 30 are mounted so as to rotate in synchronization with each other.

The angle measuring device 20 and a host computer 40 are connected by CAN communication and transmit and receive data. Further, the output of the rotary encoder 30 is transmitted to the host computer 40 via the angle measuring device 20. In this case, the output of the rotary encoder 30 may be directly connected to the host computer 40. The encoder 30 provides an absolute angle as a standard corresponding to the rotational angle of the rotating shaft.

By referring to FIGS. 5 to 8, the calibration procedure will be explained below.

Figure 5:
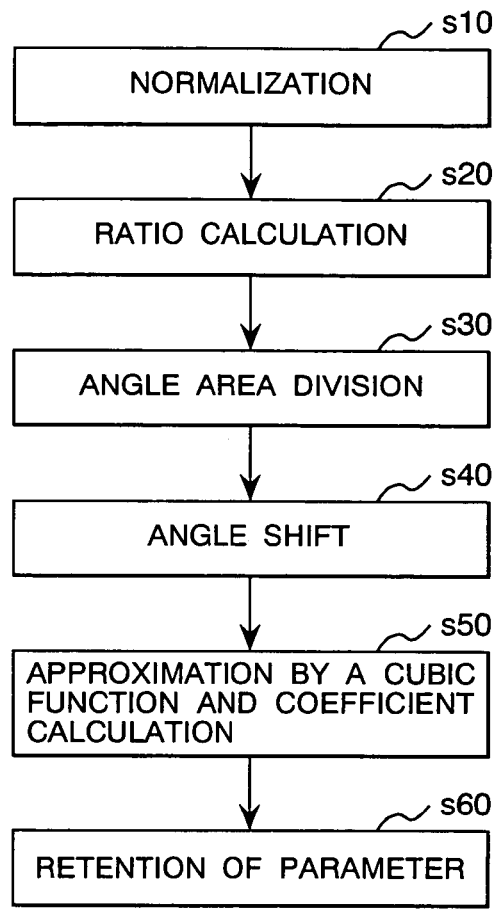
FIG. 5 is a flow chart showing the calibration procedure in the host computer used in the non-contact position sensor of an embodiment of the present invention.

FIG. 5 is a flow chart illustrating the calibration process in the host computer 40.

At Step s10 shown in FIG. 5, the host computer 40 normalizes the sensor outputs v1 and v2 using Formula (1) indicated below and calculates the normalized signals ($v1n$, $v2n$). As a result, the center value of the sensor output becomes 0.

$$v1n=v1-v1_{offset},\ v2=v2n-v2_{offset} \qquad \text{Formula (1)}$$

v1 and v2 are respectively the output signals of the sensor element 1 which are amplified to about 30 times by the amplifier. v1offset and v2offset are respectively the center values (offset values) of the sensor output calculated by (v1max+v1min)/2 and (v2max+v2min)/2. v1max is the maximum value of v1, v1min is the minimum value of v1, v2max is the maximum value of v2, and v2min is the minimum value of v2.

Next, at Step s20, the host computer 40 divides mutually the normalized signals and calculates the ratios r12 and r21 of $v1n$ and $v2n$ by the following formula (2).

$$r12=v1n/v2n,\ r21=v2n/v1n \qquad \text{Formula (2)}$$

Figure 6:
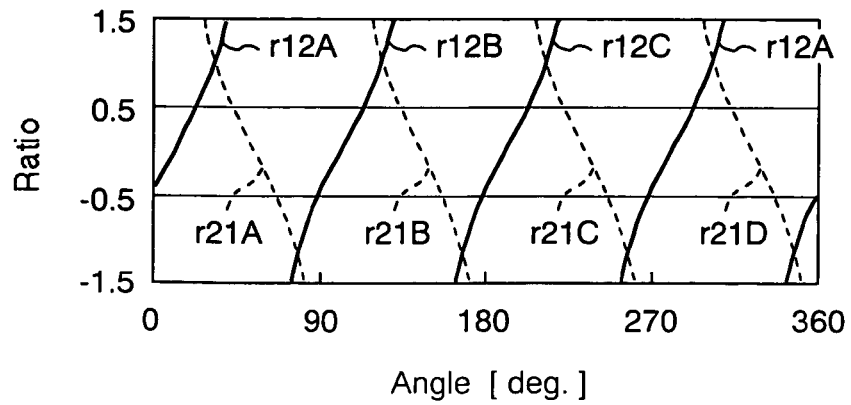
FIG. 6 is an illustration for the relationship between the rotational angle and the ratio in the non-contact position sensor of an embodiment of the present invention.

Next, by referring to FIG. 6, the relationship between the rotational angle (0° to 360°) and the ratio (r21, r12) will be indicated.

FIG. 6 is an illustration for the relationship between the rotational angle and the ratio.

Next, at Step s30, the host computer 40 divides the angular range for detecting the ratio shown in FIG. 6 into predetermined angle areas. For example, when the angle detection range of the angle measuring device is from 0 to 360°, the host computer 40 divides the angle range into 8 areas according to the following conditions. The respective divided areas have an angular range of about 45°.

When condition 1 (|r12|<1 & $v2n$>0 & Vhall1==L): area 1

When condition 2 (|r21|<1 & $v1n$>0 & Vhall2==H): area 2

When condition 3 (|r12|<1 & $v2n$<0 & Vhall2==H): area 3

When condition 4 (|r21|<1 & $v1n$<0 & Vhall1==H): area 4

When condition 5 (|r12|<1 & $v2n$>0 & Vhall1==H): area 5

When condition 6 (|r21|<1 & $v1n$>0 & Vhall2==L): area 6

When condition 7 (|r12|<1 & $v2n$<0 & Vhall2==L): area 7

When condition 8 (|r21|<1 & $v1n$<0 & Vhall1==L): area 8

In this case, Vhall1 and Vhall2, as described in U.S. Pat. No. 6,064,197, when the sensor output is symmetrical with respect to line at a certain angle, are signals used to decide the area.

Next, by referring to FIG. 7, the signals Vhall1 and Vhall2 will be explained.

Figure 7A:
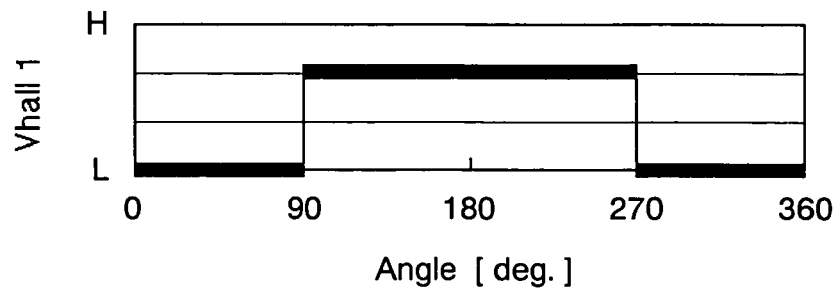
FIG. 7 is waveform diagrams of the signals Vhall1 and Vhall2 in the non-contact position sensor of an embodiment of the present invention.
Figure 7B:
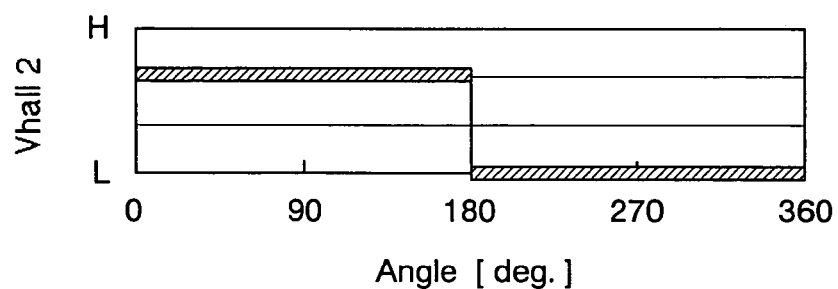

FIG. 7 shows waveform diagrams of the signals Vhall1 and Vhall2. FIG. 7(A) shows the signal Vhall1 and FIG. 7(B) shows the signal Vhall2.

The signals Vhall1 and Vhall2 are outputs of the hall element 7 shown in FIG. 1 and are used to detect an angle area exceeding 180°. The signal Vhall1, as shown in FIG. 7(A), is a high-level signal from 90° to 270° and a low-level signal in the other angle areas. The signal Vhall2, as shown in FIG. 7(B), is a high-level signal from 0° to 180° and a low-level signal in the other angle area.

Therefore, according to the aforementioned area division conditions, for example, when $v1n$=−0.17633, and $v2n$=−5.67128, and Vhall=L in an instant, the angular range belongs to "Area 1".

On the other hand, when detecting an angle area within the range from 0° to 180°, the conditions to be used are as indicated below.

When condition 1 (|r12|<1 & $v2n$>0): area 1
When condition 2 (|r21|<1 & $v1n$>0): area 2
When condition 3 (|r12|<1 & $v2n$<0): area 3
When condition 4 (|r21|<1 & $v1n$<0): area 4

By use of the above four conditions, an area can be decided.

Next, at Step s40, the host computer 40 shifts the angle of the axis of abscissa in the relationship between the ratio and the angle shown in FIG. 6. Namely, in FIG. 6, since the area 1 is from 0° to about 40° of absolute angle and from about 345° to 360°, and the area 1 is is discontinuous in the absolute angle. Therefore, to eliminate the discontinuous area, the host computer 40 shifts the absolute angle so that the boundary between the areas becomes a temporary zero point (hereinafter, referred to as an offset angle) for calculation. For example, when the offset angle is set to an absolute angle of 170° which is a boundary between the area 4 and the area 5 and the offset angle is subtracted from the absolute angle as follows:

shifted angle=absolute angle−offset angle, the shifted angle is calculated.

Figure 8:
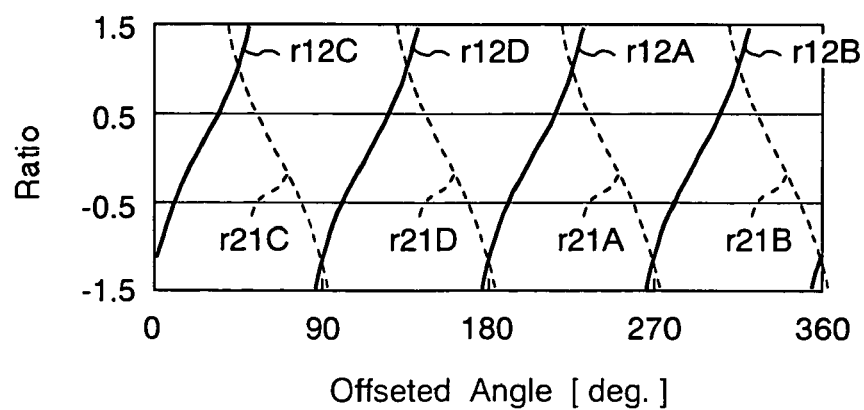
FIG. 8 is an illustration for the relationship between the shifted angle and the ratio in the non-contact position sensor of an embodiment of the present invention.

FIG. 8 is an illustration for the relationship between the shifted angle and r12 and r21. FIG. 8 shows that in each area, the shifted angle uniquely corresponds to either of r12 and r21.

Next, at Step s50, the relationship between the angle θ and the ratio shown in FIG. 8 is approximated by a cubic function and in each area, coefficients a, b, c, and d for minimizing Formula (3) indicated below are calculated.

$$\int \{\theta - (ax^3 + bx^2 + cx + d)\} d\theta \qquad \text{Formula (3)}$$

Here, θ is the shifted angle in each area. x is "ratio—r21" in the area 1, area 3, area 5, and area 7 and "ratio—r12" in the area 2, area 4, area 6, and area 8. Therefore, for example, in the area 1, when the corresponding coefficients a, b, c, and d are obtained, the mapping to the shifted angle in the area 1 from r21 can be obtained.

Next, at Step s60, the host computer 40 stores parameters in the memory 8. In this case, the parameters to be stored are the parameters used for calibration and calculated parameters. The parameters to be preserved and used are the maximum and minimum values of output 1, the maximum and minimum values of output 2, and temperature information at the time of calibration. The stored and calculated parameters are the coefficients a, b, c, and d in each area and offset angles. Further, the temperature information at the time of calibration is used for correction of the sensor output which will be described later.

By the aforementioned processes, the calibration is performed. Further, when calculating the angle, Steps s10 to s30 are performed, and the areas are decided, and then Formula (4) indicated below is calculated, and the absolute angle θ is calculated.

$$ax^3 + bx^2 + cx + d + \text{offset angle} \qquad \text{Formula (4)}$$

Next, by referring from FIGS. 9 to 12, error factors for affecting the accuracy of the calculated rotation angle will be explained.

Since calibration is performed after the sensor assembly is assembled, at the point of time when the calibration is performed, the angle error is only a calculation error of the calibration, which can be almost ignored such as ±0.2°. However, assuming the point of time when the calibration is performed as an initial state (T=Td, time=0), when temperature changes compared with that of the initial state or time elapses from the initial state, the changes are factors of an angle error. The changes from the initial state which can be seen in the sensor output are mainly as indicated below.

(1) Temperature characteristics of amplitude value
(2) Temperature characteristics of offset value
(3) Variance of amplitude value due to time Here, the amplitude value vpeak is defined as (vmax−vmin)/2 and the offset value voffset is defined as (vmax+vmin)/2.

Firstly, by referring to FIGS. 9 to 11, (1) Temperature characteristics of amplitude value and (2) Temperature characteristics of offset value will be explained.

Figure 9:
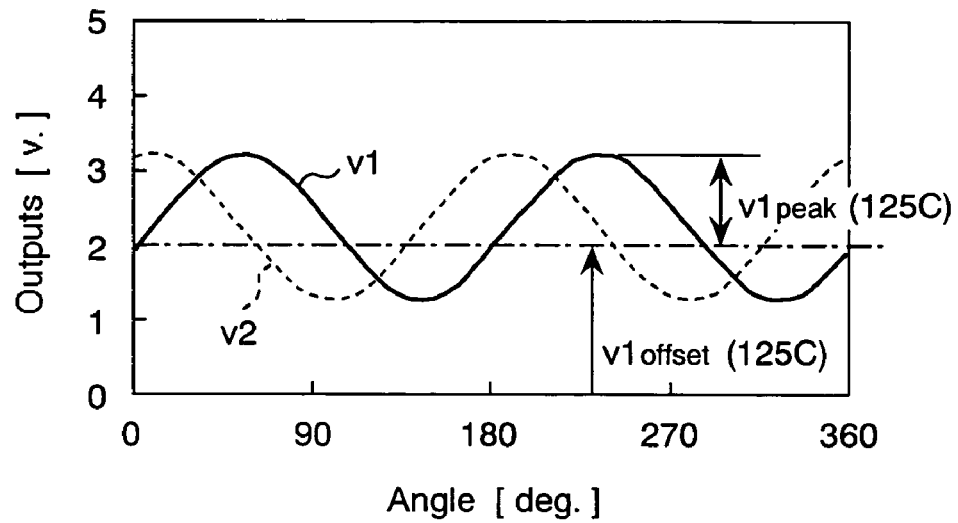
FIG. 9 is a waveform diagram of an output signal of the angle sensor element on temperature condition of 125° C. in the non-contact position sensor of an embodiment of the present invention.

FIG. 9 is a waveform diagram of output signals of the angle sensor element on temperature condition of 125° C. Here, as compared with the waveform of output signals of the angle sensor element on temperature condition of 25° C shown in FIG. 3, the amplitude v1peak of the sensor have changed as v1peak (25° C.) and v1peak (125° C.), and the v1offset have changed as v1offset (25° C.) and v1offset (125° C.). As the temperature rises, the amplitude value v1peak of the sensor outputs decreases and the offset value v1offset have changed.

Figure 10:
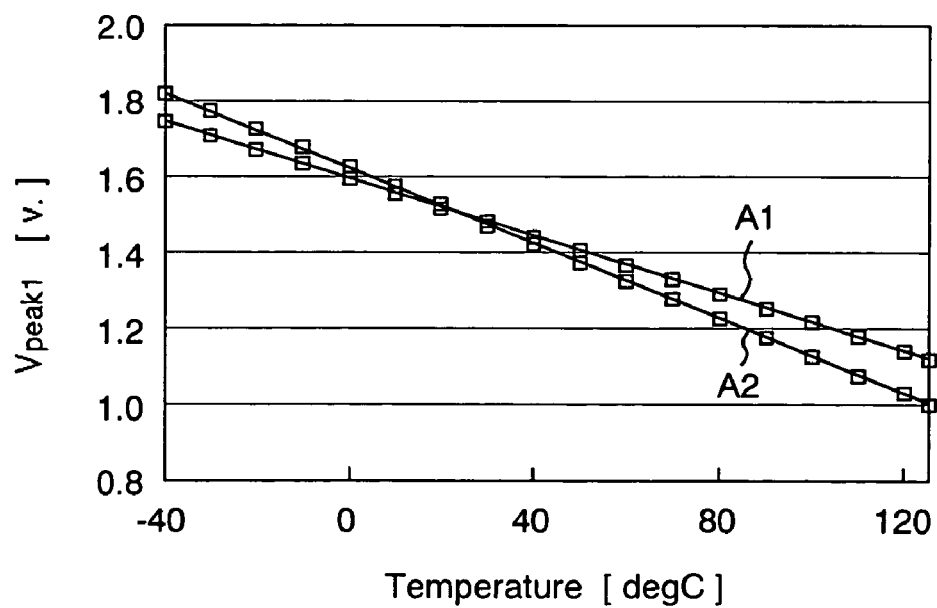
FIG. 10 is a drawing showing the relationship between the amplitude vpeak and the temperature T in the non-contact position sensor of an embodiment of the present invention.

FIG. 10 is a drawing illustrating the relationship between the amplitude value Vpeak and the temperature T. Generally, the reaction of the magnetic resister element decreases as the temperature rises, and the magnetic force of the magnet also decreases as the temperature rises, so that the amplitude value of the output shows a tendency to decrease as the temperature rises. However, the decrease rate depends on the angle sensor elements A1 and A2 and variance between the sensor elements is seen.

Figure 11:
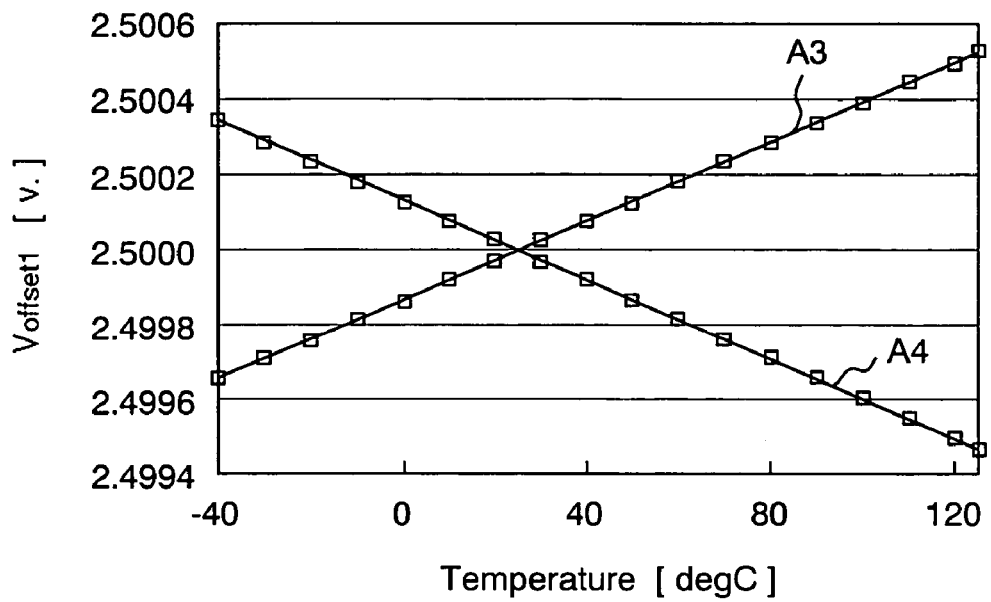
FIG. 11 is a drawing showing the relationship between the offset value voffset and the temperature T in the non-contact position sensor of an embodiment of the present invention.

Further, FIG. 11 is a drawing showing the relationship between the offset value $v_{offset}$ and the temperature T. The offset value $v_{offset}$ does not show the tendency like the amplitude value $v_{peak}$. According to a test sample, the offset value shows various characteristics such that the offset value increases as the sample temperature rises like the sensor element A3, or the offset value decreases like the sensor element A4 as the sample temperature rises.

Figure 12:
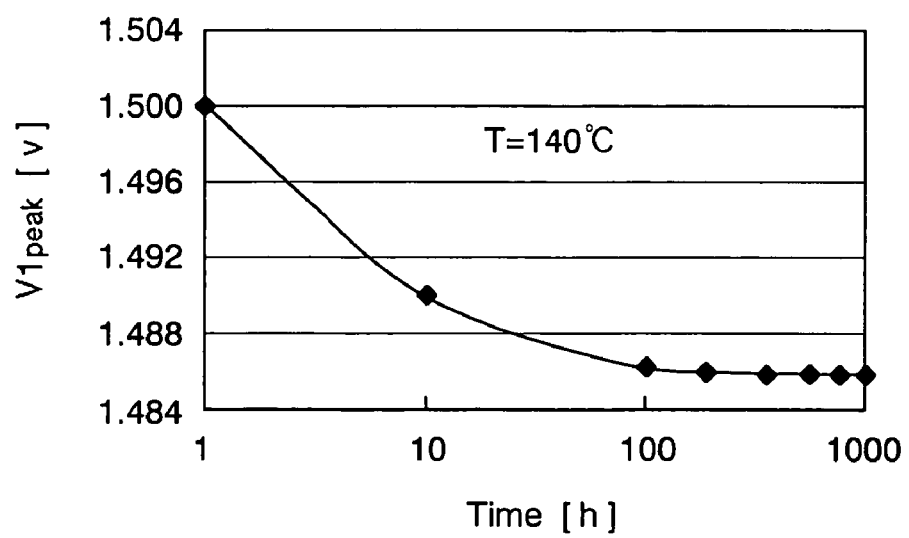
FIG. 12 is an illustration for changes of the amplitude value v1peak of the sensor element when it is used at high temperature for many hours in the non-contact position sensor of an embodiment of the present invention.

Next, by referring to FIG. 12, (3) Variance of amplitude value due to time will be explained. FIG. 12 is an illustration for explaining changes of the amplitude value v1peak of the sensor element when the sensor element is used at high temperature (for example, 140° C.) for many hours. The drawing shows that the amplitude value v1peak decreases as the time T elapses. The cause is mainly thermal demagnetization (irreversible changes) of the magnet.

Next, by referring to FIGS. 13 to 16, the first correction method of angle using the non-contact position sensor of this embodiment will be explained.

Figure 13:
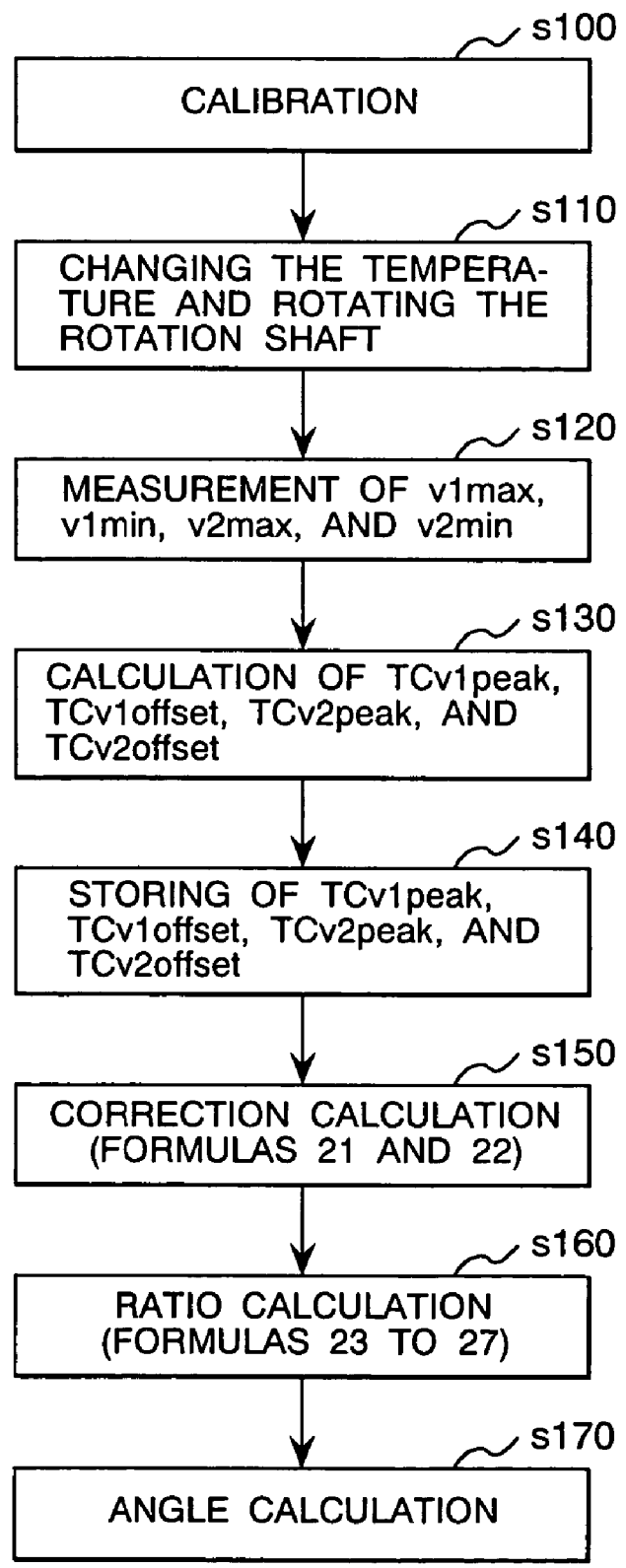
FIG. 13 is a flow chart showing the contents of the first correction method of angle using the non-contact position sensor of an embodiment of the present invention.

FIG. 13 is a flow chart showing the contents of the first correction method of angle using the non-contact position sensor of an embodiment of the present invention.

The first correction method intends to correct all the effects of the following three factors (factors adversely affecting the angle accuracy) on the angle accuracy.

(1) Temperature characteristics of amplitude value
(2) Temperature characteristics of offset value
(3) Variance of amplitude value due to time The outputs v1 and v2 of the angle sensor element are respectively expressed by the following Formulas (5) and (6).

$$v1 = v1_{peak}(Td) \cdot f(2\theta) \cdot \{1 + TCv1_{peak} \cdot (T-Td)\} \cdot \{1 + LTD1_{peak}(\text{time})\} + v1_{offset}(Td) + TCv1_{offset} \cdot (T-Td) \qquad \text{Formula (5)}$$

$$v2 = v2_{peak}(Td) \cdot g(2\theta) \cdot \{1 + TCv2_{peak} \cdot (T-Td)\} \cdot \{1 + LTD2_{peak}(\text{time})\} + v2_{offset}(Td) + TCv2_{offset} \cdot (T-Td) \qquad \text{Formula (6)}$$

Here, v1peak is a peak voltage of the output v1, v2peak is a peak voltage of the output v2, f and g are normalized functions of θ having a center value of 0 and an amplitude of ±1, Td is a temperature at the time of calibration, T is an optional temperature, θ is a rotation angle, TCv1peak is a temperature coefficient of the peak voltage v1peak, TCv2peak a temperature coefficient of the peak voltage v2peak, LTD1peak is a deterioration coefficient of the peak voltage v1peak due to time, LTD2peak is a deterioration coefficient of the peak voltage v2peak due to time, v1offset is an offset voltage of the output v1, TCv1offset is a temperature coefficient of the offset voltage v1offset, v2offset is an offset voltage of the output v2, TCv2offset is a temperature coefficient of the offset voltage v2offset, and time is an elapsed time when the time of calibration is put into the initial state.

The peak voltage v1peak, the peak voltage v2peak, the temperature coefficient TCv1peak of the peak voltage v1, the temperature coefficient TCv2peak of the peak voltage v2, the temperature coefficient TCv1offset of the offset voltage, and the temperature coefficient TCv2offset of the offset voltage are functions of temperature and the deterioration coefficients due to time LTD1peak and LTD2peak are functions of time.

At the time of calibration, T=Td and time=0 can be set, so that the outputs $v1n_{calibration}$ and $v2n_{calibration}$ at the time of calibration are expressed respectively by Formulas (7) and (8) indicated below.

$$v1_{calibration} = v1_{peak}(Td) \cdot f(2\theta) + v1_{offset}(Td) \quad \text{Formula (7)}$$

$$v2_{calibration} = v2_{peak}(Td) \cdot g(2\theta) + v2_{offset}(Td) \quad \text{Formula (8)}$$

Further, the normalized signals used at Step s10 of calibration are expressed respectively by Formulas (9) and (10) indicated below.

$$v1n_{calibration} = v1_{calibration} - v1_{offset}(Td) = v1_{peak}(Td) \cdot f(2\theta) \quad \text{Formula (9)}$$

$$v2n_{calibration} = v2_{calibration} - v2_{offset}(Td) = v2_{peak}(Td) \cdot g(2\theta) \quad \text{Formula (10)}$$

Furthermore, the ratios used at Step s20 of calibration are expressed respectively by Formulas (11) and (12) indicated below.

$$r12_{calibration} = v1n_{calibration} / v2n_{calibration} \quad \text{Formula (11)}$$
$$= \frac{v1peak(Td) \cdot f(2\theta)}{v2peak(Td) \cdot g(2\theta)}$$

$$r21_{calibration} = v2n_{calibration} / v1n_{calibration} \quad \text{Formula (12)}$$
$$= \frac{v2peak(Td) \cdot g(2\theta)}{v1peak(Td) \cdot f(2\theta)}$$

Here, when Formula (5) is compared with Formula (7) and Formula (6) is compared with Formula (8), there are some differences. By effects of these differences, the accuracy of the angle measuring device may decrease. As described below, in the first correction method, these differences are measured or inferred, and the sensor output is corrected based on these differences.

Hereinafter, by referring to the flow chart illustrating in FIG. 13, the contents of correction process by the first correction method will be explained.

At Step s100, the calibration in the initial state shown in FIG. 5 is performed.

Next, at Step s110, on two different temperature conditions, the rotating shaft of the angle measuring device is rotated and the output of the angle measuring device at that time is detected.

And, at Step s120, the maximum values v1max and v2max of the sensor output, and the minimum values v1min and v2min are measured.

Next, at Step s130, from the maximum values and minimum values obtained at Step s120, the temperature characteristics TCv1peak and TCv2peak of the amplitude value, and the temperature characteristics TCv1offset and TCv2offset of the offset value are measured.

For example, assuming two different temperature conditions as Td and T1, the amplitude value v1peak (Td) of the output v1 at the temperature Td is obtained by Formula (13) indicated below.

$$v1_{peak}(Td) = \frac{v1_{max}(Td) - v1_{min}(Td)}{2} \quad \text{Formula (13)}$$

Further, the amplitude value v1peak (T1) of the output v1 at the temperature T1 is obtained by Formula (14) indicated below.

$$v1_{peak}(T1) = \frac{v1_{max}(T1) - v1_{min}(T1)}{2} \quad \text{Formula (14)}$$

From Formulas (13) and (14), the temperature coefficient TCv1peak of the amplitude value of the output v1 is obtained by Formula (15) indicated below.

$$TCv1_{peak} = \frac{v1_{peak}(T1) - v1_{peak}(Td)}{v1_{peak}(Td) \cdot (T1 - Td)} \quad \text{Formula (15)}$$

On the other hand, the offset value v1offset (Td) at the temperature Td of the output v1 is obtained by Formula (16) indicated below.

$$v1_{offset}(Td) = \frac{v1_{max}(Td) + v1_{min}(Td)}{2} \quad \text{Formula (16)}$$

The offset value v1offset (T1) at the temperature T1 of the output v1 is obtained by Formula (17) indicated below.

$$v1_{offset}(T1) = \frac{v1_{max}(T1) + v1_{min}(T1)}{2} \quad \text{Formula (17)}$$

Therefore, the temperature coefficient TCv1offset of the offset value of the output v1 is obtained by Formula (18) indicated below.

$$TCv1_{offset} = \frac{v1_{offset}(T1) - v1_{offset}(Td)}{v1_{offset}(Td) \cdot (T1 - Td)} \quad \text{Formula (18)}$$

Similarly, also for the output v2, calculations are made and the temperature coefficient TCv2peak of the amplitude value of the output v2 is obtained by Formula (19) indicated below.

$$TCv2_{peak} = \frac{v2_{peak}(T1) - v2_{peak}(Td)}{v2_{peak}(Td) \cdot (T1 - Td)} \quad \text{Formula (19)}$$

The temperature coefficient TCv2offset of the offset value of the output v2 is obtained by Formula (20) indicated below.

$$TCv2_{offset} = \frac{v2_{offset}(T1) - v2_{offset}(Td)}{v2_{offset}(Td) \cdot (T1 - Td)} \quad \text{Formula (20)}$$

With respect to the temperature coefficients TCv1peak, TCv2peak, TCv1offset, and TCv2offset, mean values of all examinations or several samples are obtained by experimentation.

Next, at Step s140, the temperature coefficients TCv1peak, TCv2peak, TCv1offset, and TCv2offset obtained at Step s130 are stored in the memory 8. Furthermore, by the temperature sensor, the temperature T of the sensor element can be measured at an optional time.

Next, at Step s150, at an optional temperature or at an optional elapsed time, the signal processor 5 calculates Formulas (21) and (22) indicated below from the temperature coefficients TCv1peak, TCv2peak, TCv1offset, and TCv2offset stored in the memory, the output T of the temperature sensor, the sensor outputs v1 and v2, and the temperature information Td at the time of calibration, thus performs correction calculations.

$$\frac{v1 - (v1_{offset}(Td) + TCv1_{offset} \cdot (T - Td))}{1 + TCv1_{peak} \cdot (T - Td)} = v1_{peak}(Td) \cdot f(2\theta) \cdot \{1 + LTD1_{peak} \cdot (\text{time})\} \quad \text{Formula (21)}$$

$$\frac{v2 - (v2_{offset}(Td) + TCv2_{offset} \cdot (T - Td))}{1 + TCv2_{peak} \cdot (T - Td)} = v2_{peak}(Td) \cdot g(2\theta) \cdot \{1 + LTD2_{peak} \cdot (\text{time})\} \quad \text{Formula (22)}$$

Next, at Step s160, the signal processor 5 calculates the ratios by the following process. Namely, firstly, the signal processor 5 does division of Formulas (21) and (22) and calculates the ratios, thus Formula (23) or (24) indicated below is obtained.

$$\frac{v1_{peak}(Td) \cdot f(2\theta) \cdot \{1 + LTD1_{peak}(\text{time})\}}{v2_{peak}(Td) \cdot g(2\theta) \cdot \{1 + LTD2_{peak}(\text{time})\}} \quad \text{Formula (23)}$$

$$\frac{v2_{peak}(Td) \cdot g(2\theta) \cdot \{1 + LTD2_{peak}(\text{time})\}}{v1_{peak}(Td) \cdot f(2\theta) \cdot \{1 + LTD1_{peak}(\text{time})\}} \quad \text{Formula (24)}$$

In this case, the deterioration coefficients due to time of the amplitude value LTD1peak and LTD2peak are greatly affected by demagnetization of the magnet. Therefore, in an environment that the sensor element is uniformly operated by the magnetic field, differences between the output systems can be ignored, so that Formula (25) is held.

$$LTD_{peak}1(\text{time}) = LTD_{peak}2(\text{time}) \quad \text{Formula (25)}$$

And, when Formulas (23) and (24) are recalculated respectively using Formula (25), Formulas (26) and (27) are obtained.

$$\frac{v1_{peak}(Td) \cdot f(2\theta) \cdot \{1 + LTD1_{peak}(\text{time})\}}{v2_{peak}(Td) \cdot g(2\theta) \cdot \{1 + LTD2_{peak}(\text{time})\}} = \frac{v1_{peak}(Td) \cdot f(2\theta)}{v2_{peak}(Td) \cdot g(2\theta)} = r12_{calibration} \quad \text{Formula (26)}$$

$$\frac{v2_{peak}(Td) \cdot g(2\theta) \cdot \{1 + LTD2_{peak}(\text{time})\}}{v1_{peak}(Td) \cdot f(2\theta) \cdot \{1 + LTD1_{peak}(\text{time})\}} = \frac{v2_{peak}(Td) \cdot g(2\theta)}{v1_{peak}(Td) \cdot f(2\theta)} = r12_{calibration} \quad \text{Formula (27)}$$

Next, at Step s170, the corrected ratios r12calibration and r21calibration obtained by Formulas (26) and (27) are substituted for x of Formula (3) and the angle θ is calculated.

By the first correction method explained above, the output on an optional temperature condition or after an optional lapse of time is corrected and the angle can be calculated with high accuracy.

Next, by referring to FIGS. 14 to 16, effects of the correction will be explained.

Figure 14:
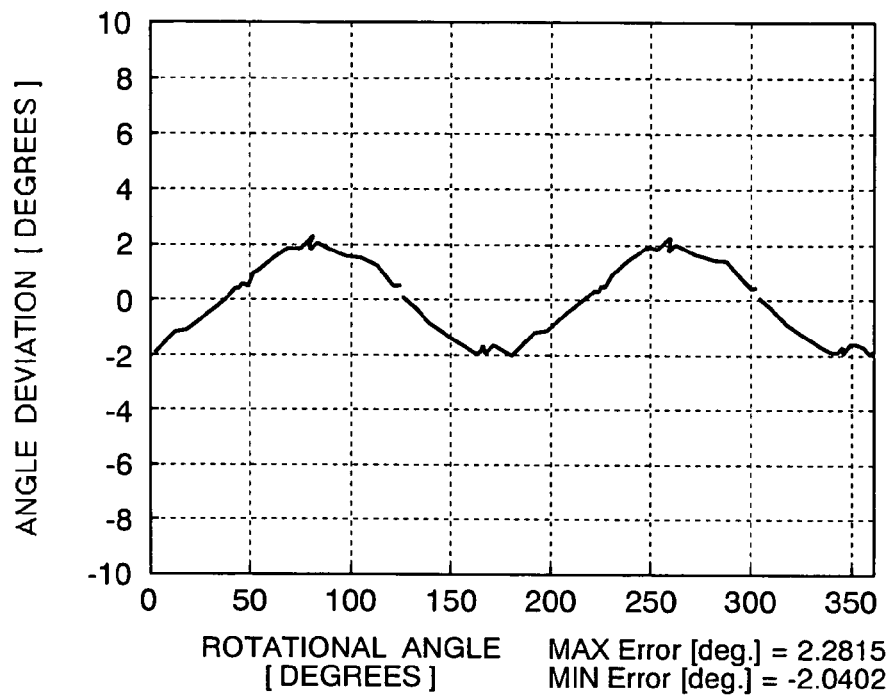
FIG. 14 is an illustration for an angle deviation when the angle is calculated from the sensor output without being corrected.

FIG. 14 shows an angle deviation when the angle is calculated from the sensor output without being corrected. FIG. 15 shows an angle deviation when the angle is calculated from the sensor output by the aforementioned correction. Here, the angle deviation is "the absolute angle–the calculated angle".

Figure 15:
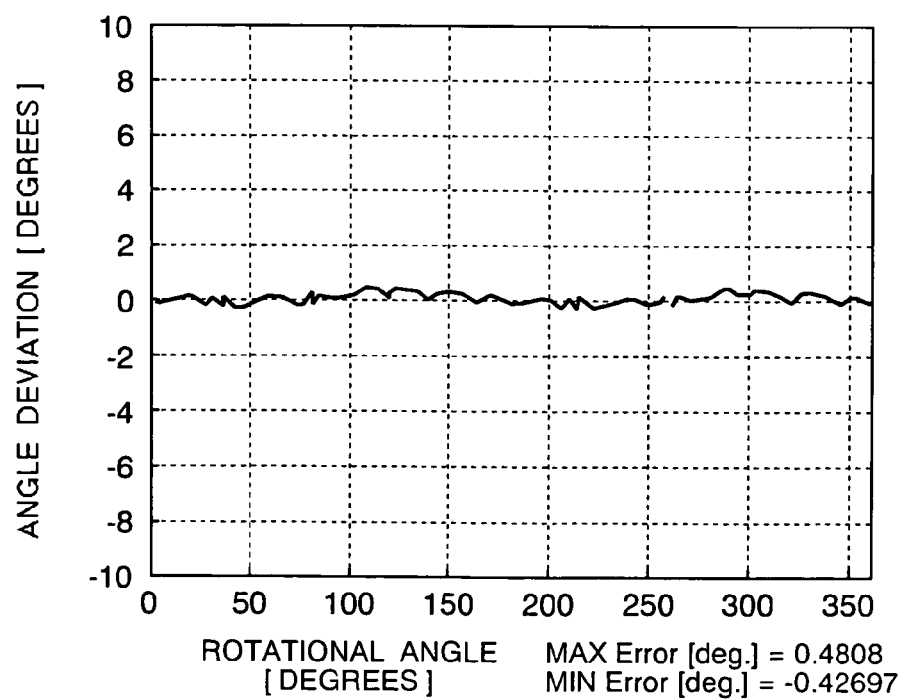
FIG. 15 is an illustration for an angle deviation when the angle is calculated from the sensor output in the non-contact position sensor of an embodiment of the present invention.

When FIGS. 14 and 15 are compared, as shown in FIG. 15, as a result of correction, the angle deviation can be reduced to 0.5° or less and the angle can be detected with high accuracy.

Figure 16:
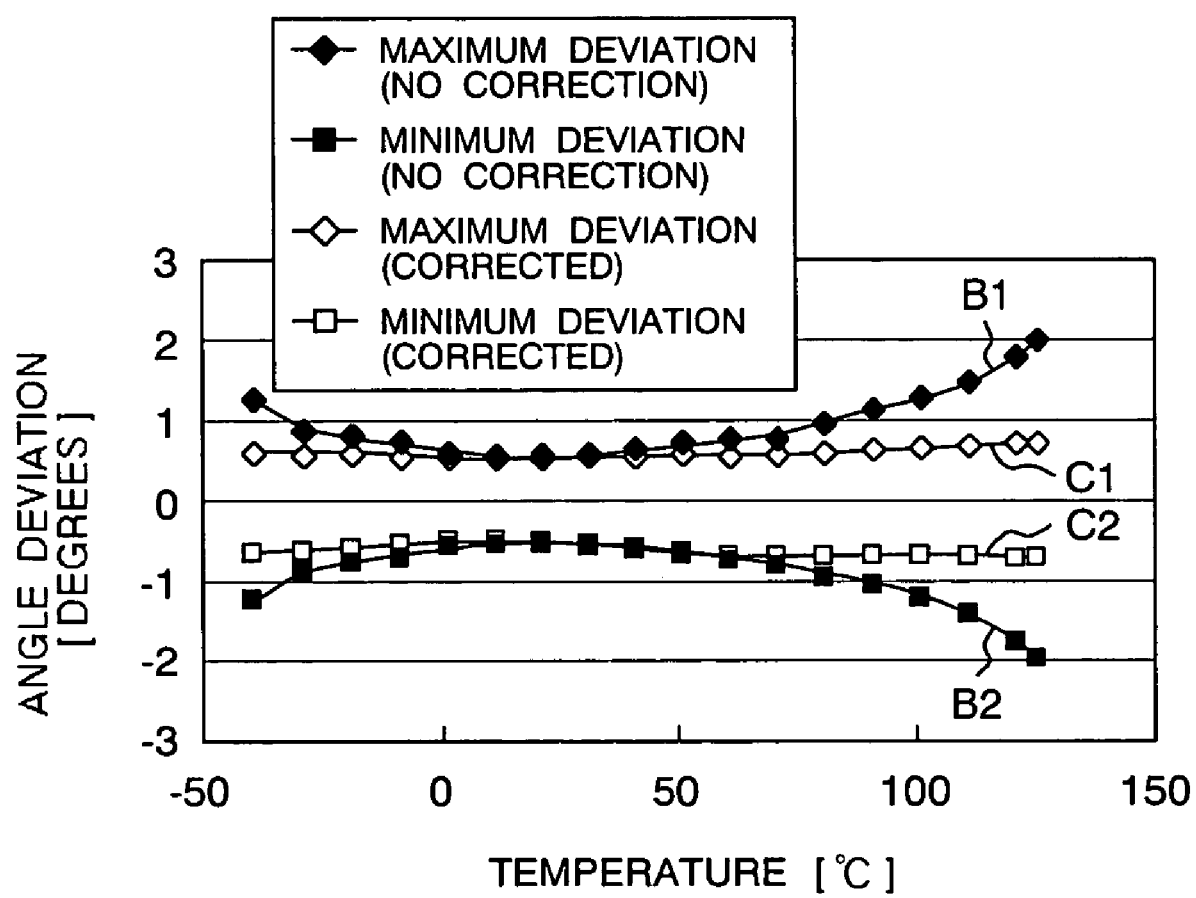
FIG. 16 is an illustration for the relationship between the temperature and the angle deviation (maximum value and minimum value) in the non-contact position sensor of an embodiment of the present invention.

FIG. 16 shows the relationship between the temperature and the angle deviation (maximum value and minimum value). A line B1 shows the maximum deviation when the angle is not corrected and a line B2 shows the minimum deviation when the angle is not corrected. A line C1 shows the maximum deviation when the angle is corrected and a line C2 shows the minimum deviation when the angle is corrected.

Figure 17:
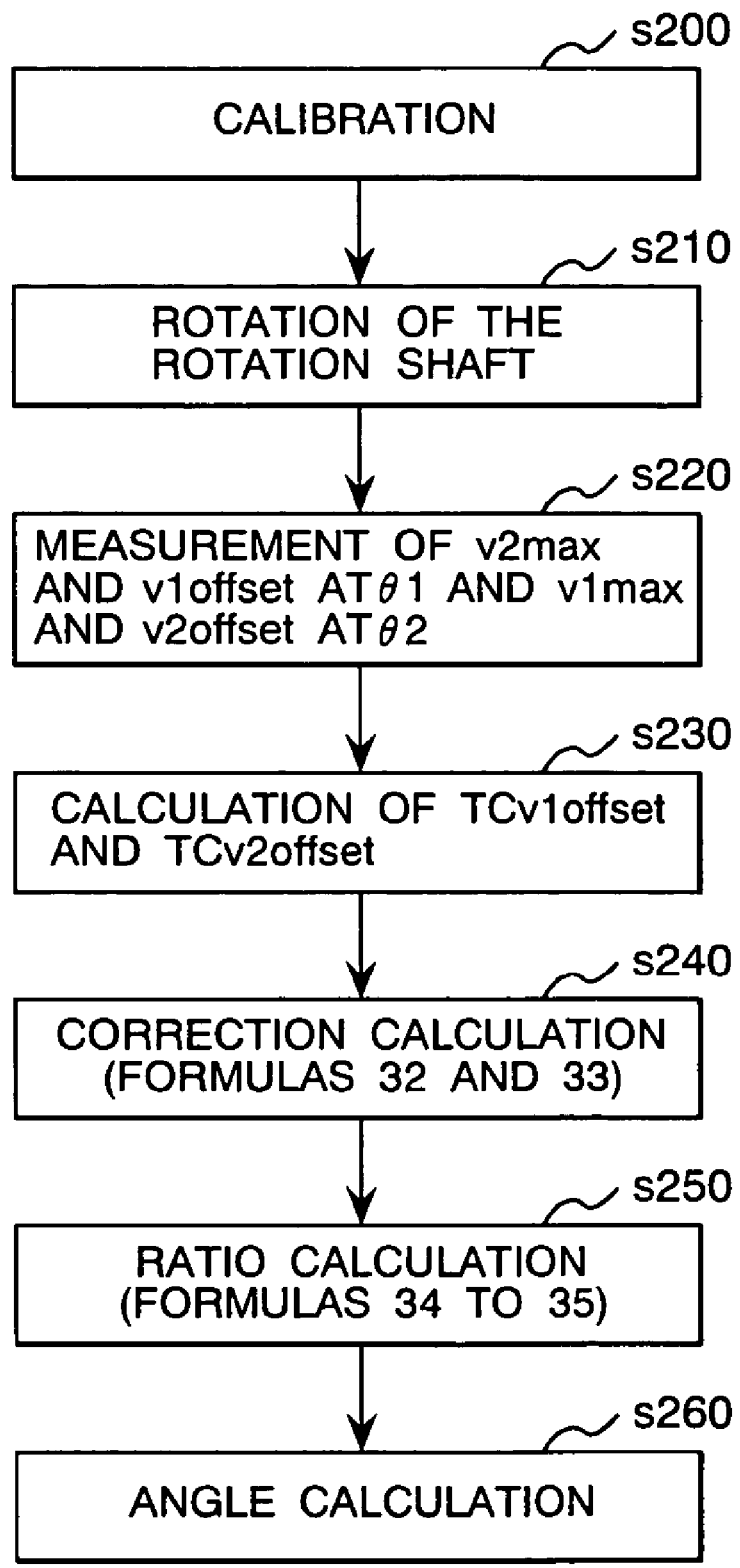
FIG. 17 is a flow chart showing the contents of the second correction method of angle using the non-contact position sensor of an embodiment of the present invention.

Generally, the calibration is executed at normal temperature (about 25° C.), so that when the angle is calculated without being corrected, the angle deviation increases as the temperature rises from the normal temperature. For example, assuming the operation temperature of the angle measuring device as −40° C. to 125° C., the maximum deviation is recorded at 125° C. However, as shown in FIG. 17, it is found that when the correction is performed, the angle detection accuracy is improved.

Next, by referring to FIGS. 17 and 18, the contents of the correction process by the second correction method will be explained.

Figure 18:
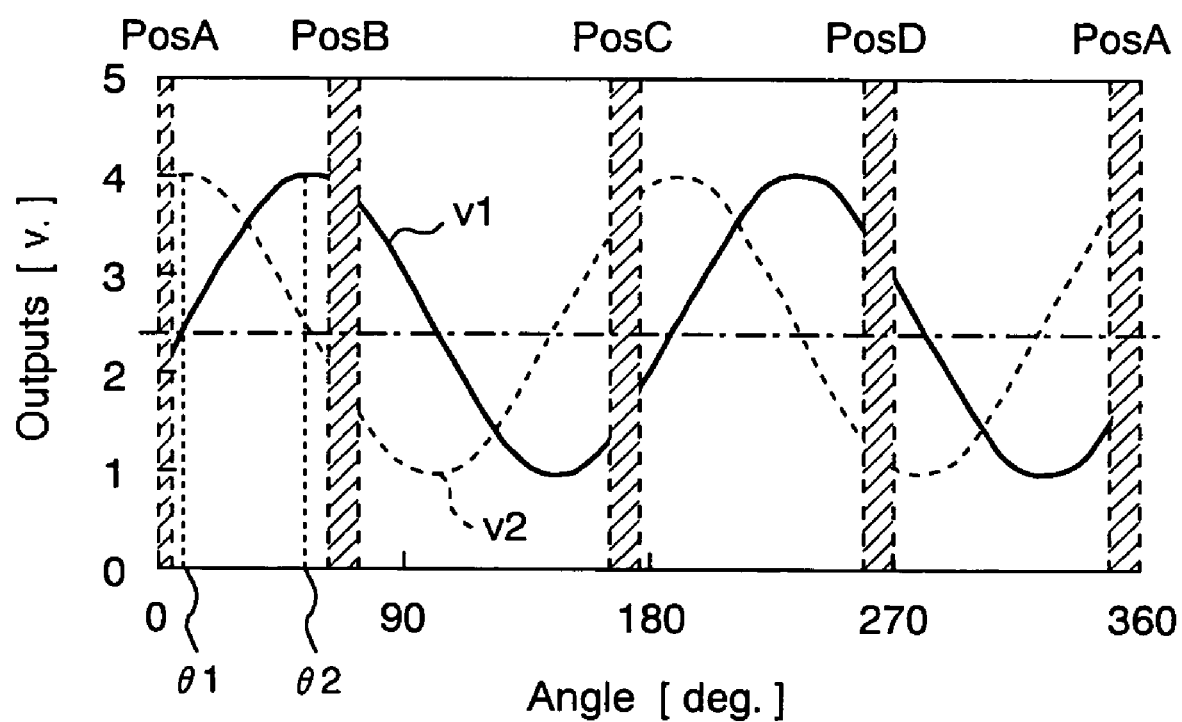
FIG. 18 is an illustration for the target angle in the non-contact position sensor of an embodiment of the present invention.

The second correction method, as shown in FIG. 18, is effective when several target angles are decided at predetermined mutually discontinuous positions beforehand. For example, as shown in FIG. 18, four target angles PosA (345° to 5°), PosB (70° to 80°), PosC (165° to 175°), and PosD (260° to 270°) are decided. Such an example is a case that the angle measuring device is applied to a shift controller for two-wheel drive—four-wheel drive switching. The shift controller detects the four positions of two-wheel drive, four-wheel drive high, four-wheel drive low, and neutral and switches to the drive mechanism corresponding to each of the four positions. At this time, the target angles PosA to PosD correspond to the four positions.

Here, at a certain time (T1), the target position is set to a certain position, for example, PosA. Since the target angle is set to PosA, the rotating shaft is stopped at the position of PosA and a predetermined sensor output is outputted according to FIG. 18. After the temperature is changed (T2), when the target angle is switched from PosA to PosB by an external signal, the rotating shaft is rotated toward the position of PosB. During this period, the temperature is changed, so that furthermore, a case that the sensor output is changed by variance due to time may be considered, and the angle accuracy is affected by output changes.

However, in this case, between PosA and PosB, the relative angle between the sensor element and the magnet is set beforehand so as to pass the peak value of the sensor output. By use of this characteristic, the aforementioned error factor can be corrected. Namely, as shown in FIG. 18, at θ1, the output 2 indicates a maximum value of v2max and at θ2, the output 1 indicates a maximum value of v1max. The phase difference between the outputs v1 and v2 is 45°, so that the moment the output 1 records the maximum value, the output 2 indicates the offset value v2offset. Further, similarly, the moment the output 2 records the maximum value, the output 1 indicates the offset value v1offset. In such a case, the angle can be corrected only by the temperature coefficient of the offset value.

Next, by referring to FIG. 17, the second correction method will be explained.

At Step s200 shown in FIG. 17, the calibration in the initial state shown in FIG. 5 is performed.

Next, at Step s210, the rotating shaft is rotated. Namely, so as to move from the target angle PosA shown in FIG. 18 to PosB and pass halfway the angles θ1 and θ2, the rotating shaft is rotated.

Next, at Step s220, at the angle θ1, the maximum value v2max of the sensor output and the minimum value v1offset of the offset value are detected and at the angle θ2, the maximum value v1max of the sensor output and the minimum value v2offset of the offset value are detected.

Next, at Step s230, from the maximum value and minimum value obtained at Step s120, the temperature characteristics TCv1offset and TCv2offset of the offset value are measured.

Here, the signal processor, from the data recorded in the memory at the time of calibration beforehand, can recognize the offset voltages (v1offset (Td), v2offset (Td)) at the time of calibration (temperature Td). Further, since the temperature (T2) during operation can be measured by the temperature sensor, the temperature coefficients TCv1offset and TCv2offset of the offset value can be calculated from Formulas (28) and (29) indicated below.

$$TCv1_{offset} = \frac{(v1_{offset}(T2) - v1_{offset}(Td))}{(T2 - Td)} \quad \text{Formula (28)}$$

$$TCv2_{offset} = \frac{(v2_{offset}(T2) - v2_{offset}(Td))}{(T2 - Td)} \quad \text{Formula (29)}$$

And, the temperature coefficients of the offset value are stored in the memory.

Next, at Step s240, the correction calculation is performed. Here, as seen in a general magnetic resister element, when the temperature characteristics of the amplitude are almost equal between the output systems and differences in the deterioration coefficient due to time of the amplitude value between the outputs can be ignored, Formulas (30) and (31) indicated below are held.

$$TCv1_{peak} = TCv2_{peak} \quad \text{Formula (30)}$$

$$LTD1_{peak}(\text{time}) = LTD2_{peak}(\text{time}) \quad \text{Formula (31)}$$

From the aforementioned, when the signal processor 5 calculates Formulas (5) and (6) using the sensor outputs (v1, v2), the offset voltages (v1offset (Td), v2offset (Td)) at the time of calibration (temperature Td), and the temperature coefficients (TCv1offset, TCv2offset) of the offset value stored in the memory, Formulas (32) and (33) indicated below are held.

$$v1-(v1_{offset}(Td)+TCv1_{offset}\cdot(T-Td))=v1_{peak}(Td)\cdot f(2\theta)$$
$$\cdot\{1+TCv1_{peak}\cdot(T-Td)\}\cdot\{1+LTD1_{peak}(\text{time})\} \quad \text{Formula 32)}$$

$$v2-(v2_{offset}(Td)+TCv2_{offset}\cdot(T-Td))=v2_{peak}(Td)\cdot g(2\theta)$$
$$\cdot\{1+TCv2_{peak}\cdot(T-Td)\}\cdot\{1+LTD2_{peak}(\text{time})\} \quad \text{Formula 33)}$$

Next, at Step s250, the signal processor calculates the ratios by the following process. Namely, firstly, the signal processor does division of Formulas (32) and (33) and calculates the ratios, thus Formula (34) or (35) indicated below is obtained.

$$\frac{v1-(v1_{offset}(Td)+TCv1_{offset}\cdot(T-Td))}{v2-(v2_{offset}(Td)+TCv2_{offset}\cdot(T-Td))} = \quad \text{Formula (34)}$$

$$\frac{v1_{peak}(Td)\cdot f(2\theta)\cdot\{1+TCv1_{peak}\cdot(T-Td)\}\cdot\{1+LTD1_{peak}(\text{time})\}}{v2_{peak}(Td)\cdot g(2\theta)\cdot\{1+TCv2_{peak}\cdot(T-Td)\}\cdot\{1+LTD2_{peak}(\text{time})\}} =$$

$$\frac{v1_{peak}(Td)\cdot f(2\theta)}{v2_{peak}(Td)\cdot g(2\theta)} = r12\text{calibration}$$

$$\frac{v2-(v1_{offset}(Td)+TCv2_{offset}\cdot(T-Td))}{v1-(v1_{offset}(Td)+TCv1_{offset}\cdot(T-Td))} = \quad \text{Formula (35)}$$

$$\frac{v2_{peak}(Td)\cdot g(2\theta)\cdot\{1+TCv2_{peak}\cdot(T-Td)\}\cdot\{1+LTD2_{peak}(\text{time})\}}{v1_{peak}(Td)\cdot f(2\theta)\cdot\{1+TCv1_{peak}\cdot(T-Td)\}\cdot\{1+LTD1_{peak}(\text{time})\}} =$$

$$\frac{v2_{peak}(Td)\cdot g(2\theta)}{v1_{peak}(Td)\cdot f(2\theta)} = r21\text{calibration}$$

Next, at Step s260, the corrected ratios r12calibration and r21calibration obtained by Formulas (34) and (35) are substituted for x of Formula (3) and the angle θ is calculated.

By the second correction method explained above, the changes of the offset value are corrected and the angle can be calculated with high accuracy.

Figure 19:
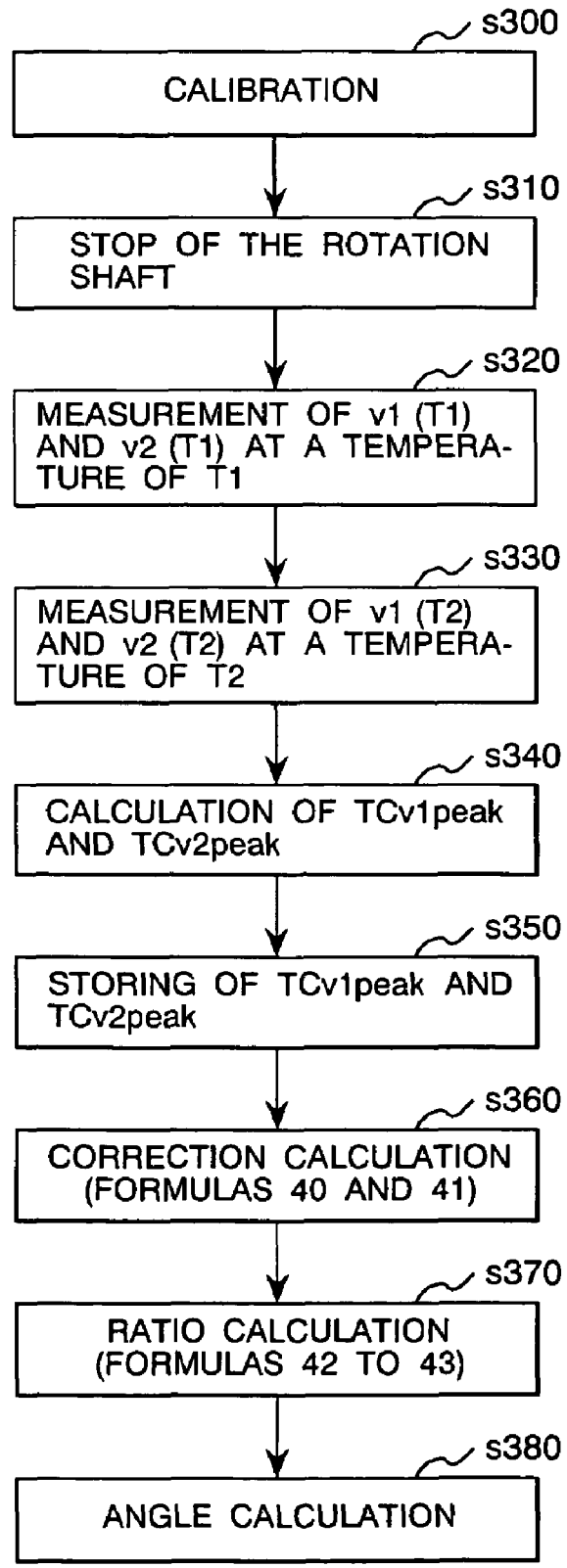
FIG. 19 is a flow chart showing the contents of the third correction method of angle using the non-contact position sensor of an embodiment of the present invention.

Next, by referring to FIG. 19, the contents of the correction process by the third correction method will be performed.

This correction method corrects only the temperature characteristics of the amplitude value.

For example, when a magnet (for example, HB-081 material by Hitachi Kinzoku) having little variance due to time caused by heat is adopted, the variance. coefficients TCv1peak and TCv2peak due to time of the amplitude value can be ignored. Further, when an operational amplifier of a low offset drift (for example, LT1050 by Linear Technology) is adopted as an amplifier, the temperature characteristics TCv1offset and TCv2offset of the offset value can be ignored.

In this case, there is no need to obtain variations of the reactive temperature characteristics of the sensor by experimentation beforehand. For example, when the rotation state of the rotating shaft is received from the outside of the angle measuring device and it can be judged on the basis of this information that the rotating shaft is stopped and when during stopping of the rotating shaft at a predetermined position, the temperature is changed from T1 to T2 and an output change is generated due to the temperature change, the changing amount can be judged to be caused by the temperature characteristics of the amplitude value.

At Step s300 shown in FIG. 19, the calibration in the initial state shown in FIG. 5 is performed.

Next, at Step s310, the rotating shaft is stopped.

Next, at Step s320, the sensor outputs v1 (T1) and v2 (T1) at the temperature T1 are detected.

Next, at Step s330, the sensor outputs v1 (T2) and v2 (T2) at the temperature T2 are detected.

Next, at Step s340, from the sensor outputs obtained at Steps s320 and s330, the temperature characteristics TCv1peak and TCv2peak of the amplitude are obtained.

Here, the variance coefficients LTD1peak and LTD21peak due to time of the amplitude value and the temperature characteristics TCv1offset and TCv2offset of the offset value can be ignored, so that when Formulas (5) and (6) are deformed, Formulas (36) and (37) indicated below are obtained.

$$v1(T1) = v1_{peak}(Td) \cdot f(2\theta) \cdot \{1 + TCv1_{peak} \cdot (T1-Td)\} + v1_{offset}(Td) \quad \text{Formula (36)}$$

$$v1(T2) = v1_{peak}(Td) \cdot f(2\theta) \cdot \{1 + TCv1_{peak} \cdot (T2-Td)\} + v1_{offset}(Td) \quad \text{Formula (37)}$$

Here, f is eliminated from Formulas (36) and (37) and from Formulas (38) and (39) indicated below, the temperature characteristics TCv1peak and TCv2peak of the amplitude are obtained.

$$TCv1_{peak} = \frac{v1(T1) - v1(T2)}{(v1(T2) - v1_{offset}(Td)) \cdot (T1-Td) - (v(T1) - v1_{offset}(Td)) \cdot (T2-Td)} \quad \text{Formula (38)}$$

$$TCv2_{peak} = \frac{v2(T1) - v2(T2)}{(v2(T2) - v2_{offset}(Td)) \cdot (T2-Td) - (v(T2) - v2_{offset}(Td)) \cdot} \quad \text{Formula (39)}$$

And, at Step s350, the temperature characteristics of the amplitude value are stored in the memory 8.

Next, at Step s360, the correction calculation is performed. Here, when Formulas (36) and (37) are deformed using the sensor outputs v1 and v2, the offset voltages v1offset (Td) and v2offset (Td) at the time of calibration (temperature Td), and the temperature coefficients TCv1peak and TCv2peak of the amplitude value stored in the memory, Formulas (40) and (41) indicated below are obtained.

$$\frac{v1(T2) - v1_{offset}(Td)}{\{1 + TCv1_{peak} \cdot (T2-Td)\}} = v1_{peak}(Td) \cdot f(2\theta) \quad \text{Formula (40)}$$

$$\frac{v2(T2) - v2_{offset}(Td)}{\{1 + TCv2_{peak} \cdot (T2-Td)\}} = v2_{peak}(Td) \cdot g(2\theta) \quad \text{Formula (41)}$$

Next, at Step s370, the signal processor calculates the ratios by the following process. Namely, firstly, the signal processor does division of Formulas (40) and (41) and calculates the ratios, thus Formula (42) or (43) indicated below is obtained.

$$\frac{v1_{peak}(Td) \cdot f(2\theta)}{v2_{peak}(Td) \cdot g(2\theta)} = r12_{calibration} \quad \text{Formula (42)}$$

$$\frac{v2_{peak}(Td) \cdot g(2\theta)}{v1_{peak}(Td) \cdot f(2\theta)} = r21_{calibration} \quad \text{Formula (43)}$$

Next, at Step s370, the corrected ratios r12calibration and r21calibration obtained by Formulas (42) and (43) are substituted for x of Formula (3) and the angle θ is calculated.

By the third correction method explained above, the temperature characteristics of the amplitude value are corrected and the angle can be calculated with high accuracy.

Also by the second and third correction methods mentioned above, as shown in FIG. 15, a highly accurate angle having little angle deviation can be detected. Further, as shown in FIG. 16, the angle deviation is reduced, thus the angle detection accuracy can be improved.

As explained above, according to this embodiment, the angle deviation is reduced, thus the angle detection accuracy can be improved.

[Effects of the Invention]

According to the present invention, the rotational angle measuring accuracy can be improved.

What is claimed is:

1. A non-contact position sensor comprising:
   a magnetic field generation means rotating together with a rotating shaft;
   a sensor element for sensing magnetic field changes generated from said magnetic field generation means due to said rotation of said rotating shaft;
   signal processing means for processing an output signal of said sensor element to measure the rotational angle of said rotating shaft on the basis of the output signal; and
   correction means for correcting variance among sensors including said sensor element, said signal processing means, and said magnetic field generation elements; wherein,
   said sensor element outputs first and second outputs v1 and v2; and
   said correction means obtains temperature coefficients of amplitude values of said output v1 and said output v2, or temperature coefficients of offset values, or coefficients of variance due to time of said amplitude values, obtains a ratio of said first and second outputs corrected by said coefficients, and calculates an angle using said corrected ratio.

2. A non-contact position sensor comprising:
   a magnetic field generation element that rotates together with a rotating shaft;
   a sensor element for sensing magnetic field changes generated from said magnetic field generation element due to rotation of said rotating shaft;
   signal processing means for processing an output signal of said sensor element to measure the rotational angle of said rotating shaft on the basis of the output signal; and
   correction means for correcting variance among sensors including said sensor element, said signal processing means, and said magnetic field generation elements; wherein,
   the output of said sensor element includes two sine waves having a mutual phase difference,
   said sensor element outputs first and second outputs v1 and v2; and
   said correction means obtains temperature coefficients of amplitude values of said output v1 and said output v2, or temperature coefficients of offset values, or coefficients of variance due to time of said amplitude values, obtains a ratio of said first and second outputs corrected by said coefficients, and calculates an angle using said corrected ratio.

* * * * *